Jan. 31, 1961  JIRO MUKAI  2,969,713
WIDE ANGLE PHOTOGRAPHIC OBJECTIVE
Filed Feb. 7, 1958
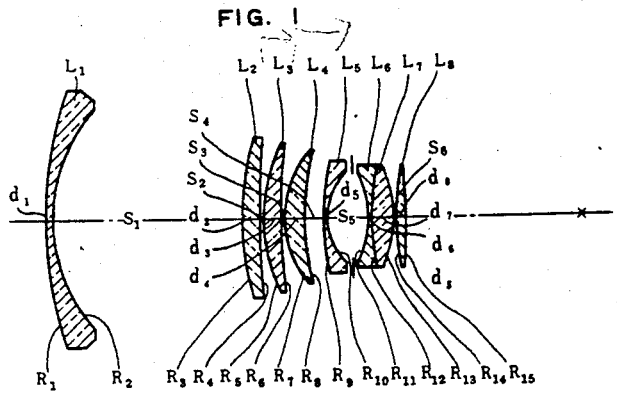
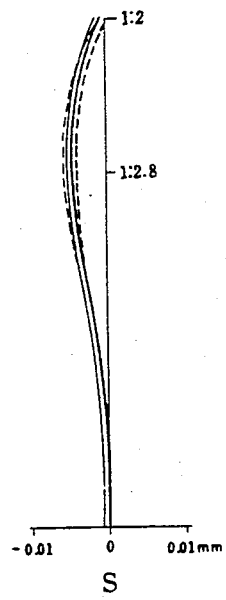
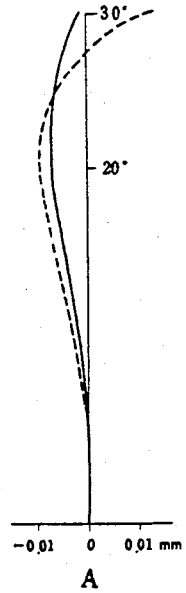
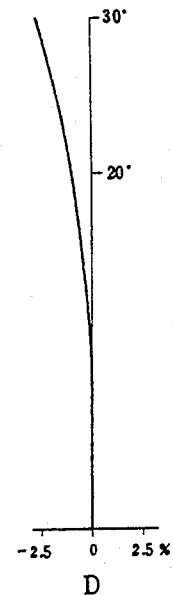
INVENTOR.
JIRO MUKAI
BY
ATTORNEY

United States Patent Office 2,969,713
Patented Jan. 31, 1961

2,969,713
WIDE ANGLE PHOTOGRAPHIC OBJECTIVE

Jiro Mukai, Kohokuku, Yokohama City, Japan, assignor to Canon Camera Company, Inc., Tokyo, Japan, a corporation of Japan Filed Feb. 7, 1958, Ser. No. 713,899

1 Claim. (Cl. 88—57)

This invention relates to a photographic objective. More particularly it relates to an objective having a long back focus.

An object of this invention is to provide a large aperture, wide angle photographic objective which has a relatively long back focus as compared with the effective focal length and whose chromatic aberration, spherical aberration, coma, astigmatism, image curvature and distortion are well corrected.

A clear concept of the scope and purpose of this invention may be obtained from the following description, in connection with the appended drawing, in which:

Fig. 1 is a sectional view showing an embodiment of the wide angle photographic objective according to the present invention; and Figs. 2 to 4 are diagrams showing the spherical aberration and deviation from the sine condition, the astigmatism and the distortion of said objective, respectively.

The objective of my invention consists of a front negative meniscus lens and a rear group widely spaced from such front lens. The rear lens group consists of at least six lenses and includes an iris diaphragm therein. Each of the lenses disposed in front of the iris diaphragm is a single meniscus lens air spaced from the others. The lens just behind the diaphragm consists of a negative element cemented to a positive element with the concave surface of the cemented lens toward the diaphragm, while the rearmost element is a positive element. In addition, the objective satisfies the relations:

$$0.5 < R_{11}/R_{13} < 1.5$$
$$-5/f < \varphi_c < 5/f$$
$$0.25\ f < R_{11} < 0.9\ f, \text{ and}$$
$$0.1\ f < S_5 < 0.3\ f$$

where $R_{subscript}$ represents the radius of curvature of the lens surface, $S_{subscript}$ the distance along the optical axis of the air space between successive lenses, $f$ the focal length of the objective, and $\varphi_c$ the refractive power of the cemented lens of the rear lens group, each series of subscripts increasing from the front to the rear of the objective.

Referring to the illustrative embodiment of Fig. 1, $L_1$ is a negative meniscus front lens, and $L_2$ to $L_8$ are the lenses of the rear lens group arranged with a large air space $S_1$ from the front lens $L_1$. In the rear lens group, the three lenses $L_2$, $L_3$ and $L_4$ are positive meniscus lenses with their respective convex surfaces directed toward the object and with their radii of curvature progressively increasing. A relatively strong negative meniscus lens $L_5$ is arranged to the rear of the three lenses $L_2$, $L_3$ and $L_4$ with its concave surface toward the image, a diaphragm being positioned just behind lens $L_5$. A cemented meniscus component consisting of a negative lens $L_6$ and a positive lens $L_7$ is disposed behind the diaphragm with its concave surface directed toward the diaphragm and a double convex lens $L_8$ is provided as the rearmost element of the objective. In the rear lens group, the number of lenses needs not always be as in the illustrative embodiment, but there should be at least six or more component lenses in the entire rear lens group and the lenses behind the diaphragm should meet the above mentioned requirements as regards the radii of curvature, focal lengths and air spacings.

A concrete embodiment of the objective according to this invention is as follows:

[F=1   f=2 and 2α=60°   Back focus=0.97f]

| | | | |
|---|---|---|---|
| $R_1 = 2.378$ | $d_1 = 0.044$ | $N_1 = 1.6127$ | $V_1 = 58.6$ |
| $R_2 = 0.846$ | $S_1 = 1.021$ | | |
| $R_3 = 1.634$ | $d_2 = 0.099$ | $N_2 = 1.6204$ | $V_2 = 60.3$ |
| $R_4 = 11.464$ | $S_2 = 0.014$ | | |
| $R_5 = 0.885$ | $d_3 = 0.094$ | $N_3 = 1.6127$ | $V_3 = 58.6$ |
| $R_6 = 3.363$ | $S_3 = 0.006$ | | |
| $R_7 = 0.556$ | $d_4 = 0.107$ | $N_4 = 1.64250$ | $V_4 = 58.09$ |
| $R_8 = 1.271$ | $S_4 = 0.092$ | | |
| $R_9 = 1.211$ | $d_5 = 0.020$ | $N_5 = 1.6254$ | $V_5 = 35.6$ |
| $R_{10} = 0.357$ | $S_5 = 0.209$ | | |
| $R_{11} = -0.625$ | $d_6 = 0.020$ | $N_6 = 1.6384$ | $V_6 = 35.4$ |
| $R_{12} = 1.200$ | $d_7 = 0.124$ | $N_7 = 1.69680$ | $V_7 = 55.61$ |
| $R_{13} = -0.729$ | $S_6 = 0.005$ | | |
| $R_{14} = 2.489$ | $d_8 = 0.065$ | $N_8 = 1.69680$ | $V_8 = 55.61$ |
| $R_{15} = -2.945$ | | | |

$R_{subscript}$ is the radius of curvature of the lens, $d_{subscript}$ the thickness of the lens at the optical axis, $S_{subscript}$ the air spacing at the optical axis, $N_{subscript}$ the index of refraction of the glass of the lens, and $V_{subscript}$ the Abbe number of the glass of the lens, the subscripts increasing in the direction from the front of the objective.

In Fig. 2 the full line graphs show the spherical aberration for the $d$-line and $g$-line, respectively, of the instant objective, the lighter dashed-line graph the deviation of the $d$-line from the sine condition and the heavier dashed-line graph of the $g$-line from the sine condition. In Fig. 3 the full line graph is the graph of the sagital field curvature of the astigmatism of the objective, and the dashed-line graph that of the meridional field curvature, while the graph of Fig. 4 is the distortion for each angle of incidence thereof.

It has been customary to arrange a negative meniscus lens as the first lens in a lens system to obtain an objective with a comparatively long back focus for its focal length. However, the greatest aperture ratio heretofore attainable with this type was only around $f$:2.8. The major cause thereof is that, if the aperture ratio becomes larger than that, not only will spherical aberration but also coma increase markedly and cause great practical difficulties. On the other hand, according to the present invention, the rear lens group is formed of six or more lenses, glasses of relatively high refractive indices are used for the positive lenses to make the zonal spherical aberration as small as possible; specifically, the lens just behind the diaphragm is a cemented meniscus lens composed of a negative and a positive lens cemented together, with the concave surface directed toward the diaphragm, the absolute value of the radius of curvature of such concave surface being from 0.25 $f$ to 0.9 $f$, the refractive power of said meniscus lens is from $-5/f$ to $5/f$, the ratio of the radii of curvature of both air bounded surfaces is between 0.5 to 1.5, the air space including the diaphragm is between 0.1 to 0.3 $f$. Coma is thereby effectively corrected. Thus, the present invention provides a wide angle photographic objective having a relative aperture of $f{:}2$, which has been hitherto held most difficult to make.

What I claim is:

A wide angle photographic lens satisfying the following relations:

[$f=1$    $F{:}2$    $2\alpha=60°$    Back focus$=0.97f$]

| Lens | Radius of Curvature | Lens Thickness or Air Spacing | Refractive Index | Abbe Number |
|---|---|---|---|---|
| $L_1$ | $R_1=2.378$ | $d_1=0.044$ | $N_1=1.6127$ | $V_1=58.6$ |
|  | $R_2=0.846$ | $S_1=1.021$ |  |  |
| $L_2$ | $R_3=1.634$ | $d_2=0.099$ | $N_2=1.6204$ | $V_2=60.3$ |
|  | $R_4=11.464$ | $S_2=0.014$ |  |  |
| $L_3$ | $R_5=0.885$ | $d_3=0.094$ | $N_3=1.6127$ | $V_3=58.6$ |
|  | $R_6=3.363$ | $S_3=0.006$ |  |  |
| $L_4$ | $R_7=0.556$ | $d_4=0.107$ | $N_4=1.6425$ | $V_4=58.09$ |
|  | $R_8=1.271$ | $S_4=0.092$ |  |  |
| $L_5$ | $R_9=1.211$ | $d_5=0.020$ | $N_5=1.6254$ | $V_5=35.6$ |
|  | $R_{10}=0.357$ | $S_5=0.209$ |  |  |
| $L_6$ | $R_{11}=-0.625$ | $d_6=0.020$ | $N_6=1.6364$ | $V_6=35.4$ |
|  | $R_{12}=1.200$ |  |  |  |
| $L_7$ | $R_{13}=-0.729$ | $d_7=0.124$ | $N_7=1.69680$ | $V_7=55.61$ |
|  |  | $S_6=0.005$ |  |  |
| $L_8$ | $R_{14}=2.489$ | $d_8=0.065$ | $N_8=1.6968$ | $V_8=55.61$ |
|  | $R_{15}=-2.945$ |  |  |  | where $L_{subscript}$ is the lens, $R_{subscript}$ the radius of curvature of the lens surface, $d_{subscript}$ the thickness of the lens at the optical axis, $S_{subscript}$ the spacing between lenses, $N_{subscript}$ the index of refraction of the glass of the lens, and $V_{subscript}$ the Abbe number of the lens, each series of subscripts increasing for each element in the direction from the front to the back of the photographic objective.

References Cited in the file of this patent
UNITED STATES PATENTS

| | | |
|---|---|---|
| 2,612,077 | Albrecht | Sept. 30, 1952 |
| 2,649,022 | Angenieux | Aug. 18, 1953 |
| 2,662,447 | Tronnier | Dec. 15, 1953 |
| 2,746,351 | Tronnier | May 22, 1956 |
| 2,780,139 | Lange | Feb. 5, 1957 |
| 2,796,002 | Klemt | June 18, 1957 |
| 2,824,494 | Klemt | Feb. 25, 1958 |